(12) United States Patent
Bhatkar (10) Patent No.: US 9,208,314 B1
(45) Date of Patent: Dec. 8, 2015

(54) SYSTEMS AND METHODS FOR DISTINGUISHING CODE OF A PROGRAM OBFUSCATED WITHIN A PACKED PROGRAM

(71) Applicant: Symantec Corporation, Mountain View, CA (US)

(72) Inventor: Sandeep Bhatkar, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 57 days.

(21) Appl. No.: 14/135,004

(22) Filed: Dec. 19, 2013

(51) Int. Cl.
G06F 11/00 (2006.01)
G06F 12/14 (2006.01)
G06F 12/16 (2006.01)
G08B 23/00 (2006.01)
G06F 21/56 (2013.01)

(52) U.S. Cl.
CPC .................................. G06F 21/563 (2013.01)

(58) Field of Classification Search
CPC ...................................................... G06F 21/55
USPC ........................................................ 726/23
See application file for complete search history.

(56) References Cited

U.S. PATENT DOCUMENTS

| | | | |
|---|---|---|---|
| 8,336,100 B1 | 12/2012 | Glick et al. | |
| 8,418,245 B2 * | 4/2013 | Horne | 726/22 |
| 8,479,291 B1 | 7/2013 | Bodke | |
| 8,561,193 B1 | 10/2013 | Srivastava et al. | |
| 8,769,692 B1 * | 7/2014 | Muttik et al. | 726/24 |
| 2006/0236397 A1 * | 10/2006 | Horne | 726/24 |
| 2007/0168982 A1 * | 7/2007 | Horne | 717/124 |
| 2008/0028462 A1 * | 1/2008 | Burtscher | 726/22 |
| 2011/0145921 A1 * | 6/2011 | Mathur et al. | 726/23 |
| 2014/0189882 A1 * | 7/2014 | Jung et al. | 726/27 |
| 2014/0283058 A1 * | 9/2014 | Gupta | 726/23 |

OTHER PUBLICATIONS

Roberto Perdisci; Classification of Packed Executables for Accurate Computer Virus Detection; Year: 2008; Georgia Institute of Technology, Atlanta, GA 30332, USA; p. 1-15.*
Mark Kennedy; Methods and Systems for Detecting Obfuscated Executables; U.S. Appl. No. 12/130,827, filed May 30, 2008.
Bilge, Leyla et al., "Thwarting Real-Time Dynamic Unpacking", http://www.syssec-project.eu/m/page-media/3/unpacking-eurosec11.pdf, as accessed Nov. 7, 2013, (2011).

(Continued)

*Primary Examiner* — Monjour Rahim
(74) *Attorney, Agent, or Firm* — ALG Intellectual Property, LLC (57) ABSTRACT

A computer-implemented method for distinguishing code of a program obfuscated within a packed program may include (1) retrieving memory of the packed program that includes the code of the obfuscated program in an unobfuscated state and unpacking code that unpacks the code of the obfuscated program when the packed program is executed, (2) identifying an import address table within the memory of the packed program, (3) determining that the import address table is an import address table of the code of the obfuscated program, (4) determining that a region of code within the memory of the packed program may be the code of the obfuscated program by determining that the region of code uses the import address table, and (5) performing a security operation on the region of code. Various other methods, systems, and computer-readable media are also disclosed.

20 Claims, 7 Drawing Sheets

(56) References Cited

OTHER PUBLICATIONS

Shevchenko, Alisa "Malicious Code Detection Technologies", http://www.computerlinks.com/FMS/13661.malicious_code_detection_technologies.pdf, as accessed Nov. 7, 2013, Kaspersky Lab, Inc., Woburn, MA, (2008).

Shevchenko, Alisa "The evolution of technologies used to detect malicious code", http://www.securelist.com/en/analysis/204791972/The_evolution_of_technologies_used_to_detect_malicious_code?print_mode=1, as accessed Nov. 7, 2013, Kaspersky Lab ZAO, (Apr. 4, 2012).

Yason, Mark V., "The Art of Unpacking", http://www.blackhat.com/presentations/bh-usa-07/Yason/Whitepaper/bh-usa-07-yason-WP.pdf, as accessed Nov. 7, 2013, Black Hat Briefings and Training, Las Vegas, NV, (2007).

"Generic unpacking techniques.pdf—Google", http://b00ks-d0c.googlecode.com/svn/trunk/b00ks-d0c/research/Malware%20Packer/Generic%20unpacking%20techniques.pdf, as accessed Nov. 7, 2013.

Ming, Jiang "A Quick Survey on Automatic Unpacking Techniques-3", http://www.personal.psu.edu/jum310/blogs/jiang_ming/2013/04/a-quick-survey-on-automatic-unpacking-techniques--3.html, as accessed Nov. 7, 2013, (Apr. 25, 2013).

Alejandro Arellano, et al.; Systems and Methods for Automatically Identifying Changes in Deliverable Files; U.S. Appl. No. 14/025,796, filed Sep. 12, 2013.

* cited by examiner

SYSTEMS AND METHODS FOR DISTINGUISHING CODE OF A PROGRAM OBFUSCATED WITHIN A PACKED PROGRAM

BACKGROUND

Because many existing antivirus technologies detect malicious programs ("malware") by detecting or identifying unique digital signatures or fingerprints associated with known-malicious programs, malware authors have attempted to proliferate malware by generating thousands or potentially millions of unique variations of the same malicious program. Often, malware authors may create a unique variation of a malicious program by packing (e.g., compressing, encrypting, and/or otherwise obfuscating) the malicious program within a new program (referred to as a "packed program"). When the packed program is executed, additional code within the packed program may unpack (e.g., decompress and/or decrypt) and then execute the obfuscated malicious program. This packing process may enable the malicious program to evade detection by existing antivirus technologies.

Various techniques for unpacking obfuscated programs from packed programs have been developed to facilitate malware detection and analysis. Unfortunately, existing techniques for unpacking obfuscated programs from packed programs are generally unable to distinguish the code of an obfuscated program contained within a packed program from the code used by the packed program to unpack the malicious program. Accordingly, the instant disclosure identifies a need for additional and improved systems and methods for distinguishing code of a program obfuscated within a packed program.

SUMMARY

As will be described in greater detail below, the instant disclosure generally relates to systems and methods for distinguishing the code of programs obfuscated within packed programs from other code within the packed programs (e.g., unpacking code). In one example, a computer-implemented method for distinguishing code of a program obfuscated within a packed program may include (1) retrieving memory of the packed program that includes the code of the obfuscated program in an unobfuscated state and unpacking code that unpacks the code of the obfuscated program when the packed program is executed, (2) identifying an import address table within the memory of the packed program, (3) determining, based at least in part on at least one characteristic of the import address table, that the import address table may be an import address table of the code of the obfuscated program, (4) determining that a region of code within the memory of the packed program may be all or a portion of the code of the obfuscated program by determining that the region of code uses the import address table, and (5) performing a security operation on the region of code.

In some embodiments, the step of identifying the import address table may include (1) identifying import-address-table entries within the memory of the packed program and (2) identifying two or more continuous import-address-table entries from the import-address-table entries that may be the import address table.

In some embodiments, the step of identifying the import-address-table entries may include identifying, for each of the import-address-table entries, a memory address with which at least one instruction within the memory of the packed program uses the import-address-table entry.

In some embodiments, the step of determining that the import address table may be the import address table of the code of the obfuscated program may include determining that the import address table is the largest import address table within the memory of the packed program and/or that the import address table is larger than a predetermined threshold.

In some embodiments, the determination that the import address table may be the import address table of the code of the obfuscated program may be based at least in part on where the import address table is located within the memory of the packed program in relation to at least one additional import address table within the memory of the packed program.

In some embodiments, the step of determining that the import address table may be the import address table of the code of the obfuscated program may include determining that the import address table includes addresses to shared-library functions that are not used for unpacking operations and/or that the import address table was the last import address table within the memory of the packed program to be populated.

In some embodiments, the step of determining that the region of code may be all or a portion of the code of the obfuscated program may include determining that at least one instruction within the region of code uses the import address table.

In some embodiments, the step of determining that the region of code may be all or a portion of the code of the obfuscated program may include identifying, from among the functions within the memory of the packed program that include at least one instruction that uses the import address table, a first function whose start address within the memory of the packed program is lowest and a second function whose end address within the memory of the packed program is highest, wherein the region of code includes at least a region of the memory of the packed program from the start address of the first function to the end address of the second function.

In some embodiments, the step of performing the security operation may include analyzing the region of code within the memory of the packed program and/or determining that the region of code within the memory of the packed program may be malware.

In one embodiment, a system for distinguishing code of a program obfuscated within a packed program may include (1) a retrieving module, stored in memory, that retrieves memory of a packed program that includes the code of the obfuscated program in an unobfuscated state and unpacking code that unpacks the code of the obfuscated program when the packed program is executed, (2) an identifying module, stored in memory, that identifies an import address table within the memory of the packed program, (3) an import-address-table determining module, stored in memory, that determines, based at least in part on at least one characteristic of the import address table, that the import address table may be an import address table of the code of the obfuscated program, (4) a code-region determining module, stored in memory, that determines that a region of code within the memory of the packed program may be all or a portion of the code of the obfuscated program by determining that the region of code uses the import address table, (5) a security module, stored in memory, that performs a security operation on the region of code, and (6) at least one physical processor that executes the retrieving module, the identifying module, the import-address-table determining module, the code-region determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to distinguish code of a program obfuscated within a packed program by (1) executing the packed program that includes the code of the obfuscated program in an unobfuscated state and unpacking code that unpacks the code of the obfuscated program when the packed program is executed, (2) identifying an import address table within the memory of the packed program, (3) determining, based at least in part on at least one characteristic of the import address table, that the import address table may be an import address table of the code of the obfuscated program, (4) determining that a region of code within the memory of the packed program may be all or a portion of the code of the obfuscated program by determining that the region of code uses the import address table, and (5) performing a security operation on the region of code.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for distinguishing code of a program obfuscated within a packed program. As will be explained in greater detail below, by identifying an import address table within the memory of a packed program that corresponds to the code of a malicious program obfuscated within the packed program, the systems and methods described herein may distinguish the code of the malicious program from other code within the memory of the packed program (e.g., unpacking code). Moreover, by distinguishing the code of a malicious program from other code within the memory of a packed program, the systems and methods described herein may enable the malicious program to be detected and/or analyzed. Embodiments of the instant disclosure may also provide various other advantages and features, as discussed in greater detail below.

Figure 1:
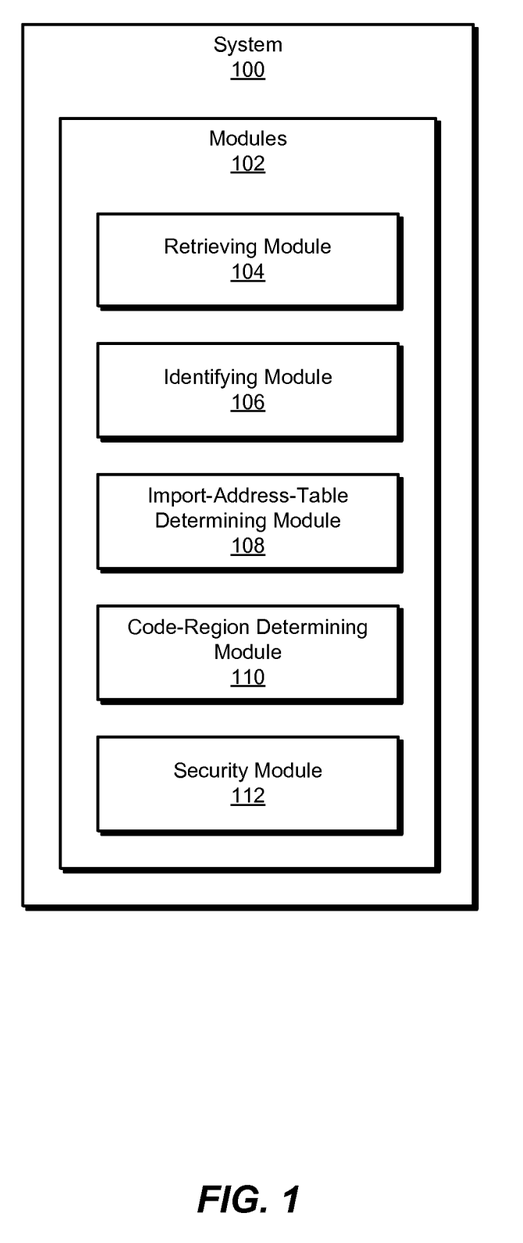
FIG. 1 is a block diagram of an exemplary system for distinguishing code of a program obfuscated within a packed program.
Figure 2:
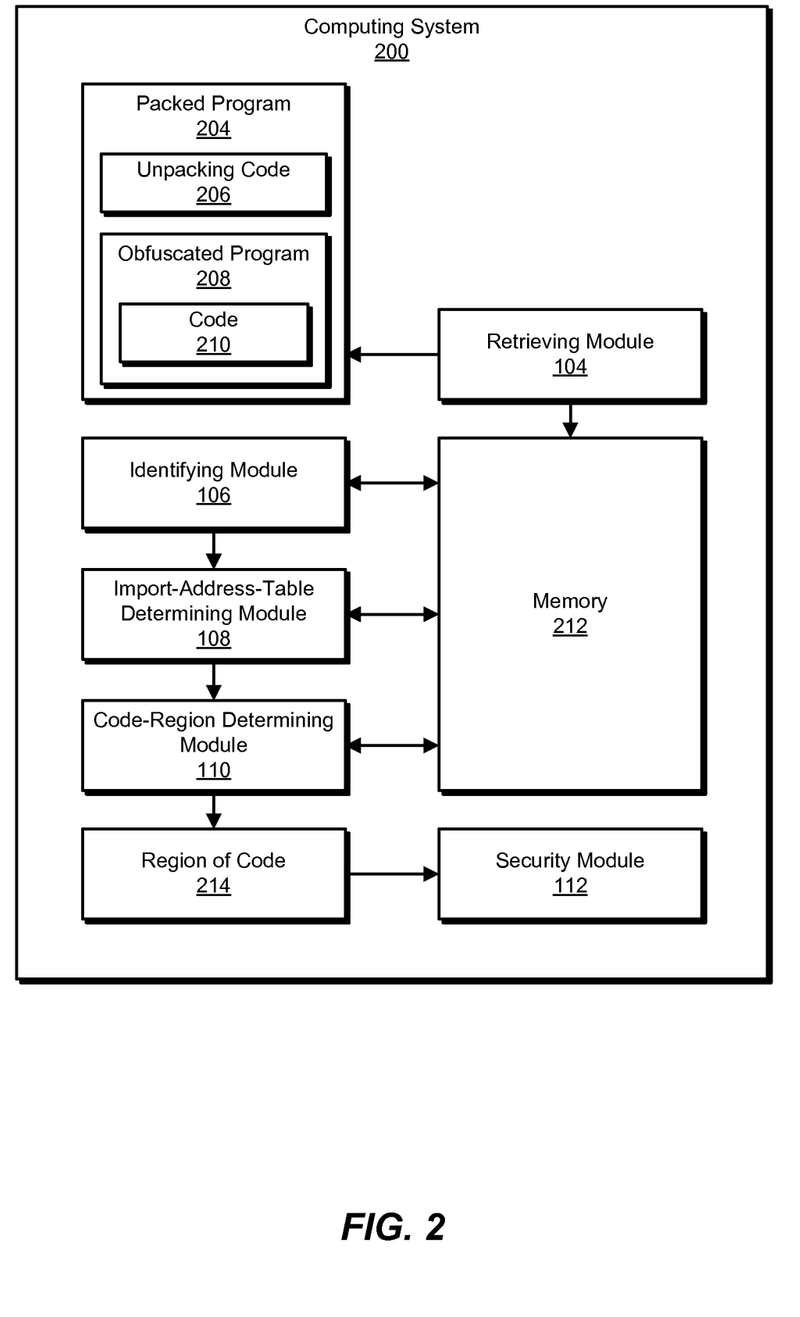
FIG. 2 is a block diagram of an additional exemplary system for distinguishing code of a program obfuscated within a packed program.

The following will provide, with reference to FIGS. 1-2, detailed descriptions of exemplary systems for distinguishing code of a program obfuscated within a packed program. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for distinguishing code of a program obfuscated within a packed program. As illustrated in this figure, exemplary system 100 may include one or more modules 102 for performing one or more tasks. For example, and as will be explained in greater detail below, exemplary system 100 may include a retrieving module 104 that retrieves memory of a packed program. Exemplary system 100 may also include an identifying module 106 that that identifies an import address table within the memory of the packed program. Exemplary system 100 may further include an import-address-table determining module 108 that determines, based at least in part on at least one characteristic of the import address table, that the import address table within the memory of the packed program may be an import address table of the code of an obfuscated program.

In addition, and as will be described in greater detail below, exemplary system 100 may include a code-region determining module 110 that determines that a region of code within the memory of the packed program may be all or a portion of the code of the obfuscated program by determining that the region of code uses the import address table. Exemplary system 100 may also include a security module 112 that performs a security operation on the region of code. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing system 200 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary computing system 200 in FIG. 2. As shown in FIG. 2, computing system 200 may be programmed with one or more of modules 102. In one embodiment, one or more of modules 102 from FIG. 1 may, when executed by at least one processor of computing system 200, enable computing system 200 to distinguish code of a program obfuscated within a packed program. For example, and as will be described in greater detail below, one or more of modules 102 may cause computing system 200 to distinguish code 210 within packed program 204 by (1) retrieving memory 212 of packed program 204 that includes code 210 in an unobfuscated state (e.g., as illustrated in unpacked memory 416 in FIGS. 4 and 5) and unpacking code 206, (2) identifying an import address table within memory 212 (e.g., import address table 404 within unpacked memory 416), (3) determining, based at least in part on at least one characteristic of the import address table, that the import address table may be an import address table of code 210, (4) determining that a region of code (e.g., region of code 214) within memory 212 may be all or a portion of code 210 by determining that the region of code uses the import address table, and (5) performing a security operation on the region of code.

Computing system 200 generally represents any type or form of computing device capable of reading computer-executable instructions. Examples of computing system 200 include, without limitation, laptops, tablets, desktops, servers, cellular phones, Personal Digital Assistants (PDAs), multimedia players, embedded systems, application servers and database servers configured to provide various database services and/or run certain software applications, combinations of one or more of the same, exemplary computing system 610 in FIG. 6, or any other suitable computing device.

Figure 3:
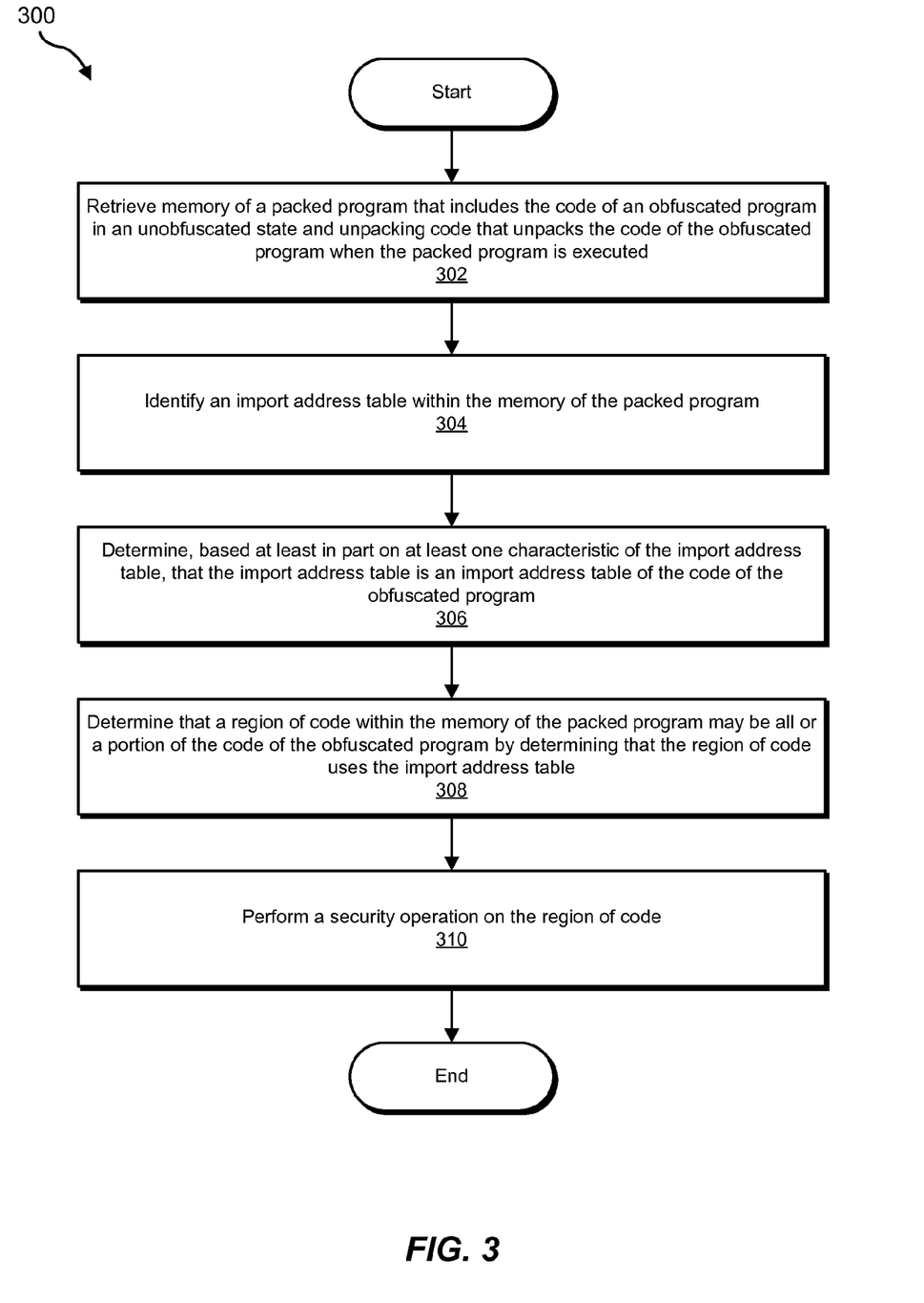
FIG. 3 is a flow diagram of an exemplary method for distinguishing code of a program obfuscated within a packed program.

FIG. 3 is a flow diagram of an exemplary computer-implemented method 300 for distinguishing code of a program obfuscated within a packed program. The steps shown in FIG. 3 may be performed by any suitable computer-executable code and/or computing system. In some embodiments, the steps shown in FIG. 3 may be performed by one or more of the components of system 100 in FIG. 1, computing system 200 in FIG. 2, computing system 610 in FIG. 6, and/or portions of exemplary network architecture 700 in FIG. 7.

As illustrated in FIG. 3, at step 302 one or more of the systems described herein may retrieve memory of a packed program that includes the code of an obfuscated program in an unobfuscated state and unpacking code that unpacks the code of the obfuscated program when the packed program is executed. For example, retrieving module 104 may, as part of computing system 200 in FIG. 2, retrieve memory 212 of packed program 204 that includes code 210 in an unobfuscated state and unpacking code 206. In the examples used herein, unpacked memory 416 in FIGS. 4 and 5 may represent a state of memory 212 that includes code 210 in an unobfuscated state.

As used herein, the phrase "program" generally refers to any file that includes code (i.e., instructions) that may be executed by a computing device (e.g., an executable or a binary). A program may be formatted according to any suitable executable file format. For example, a program may be formatted according to a Portable Executable (PE) file format. The phrase "program" may also refer to any program capable of being executed by a WINDOWS operating system, a LINUX operating system, a MAC operating system, a UNIX operating system, and/or any other operating system.

Figure 4:
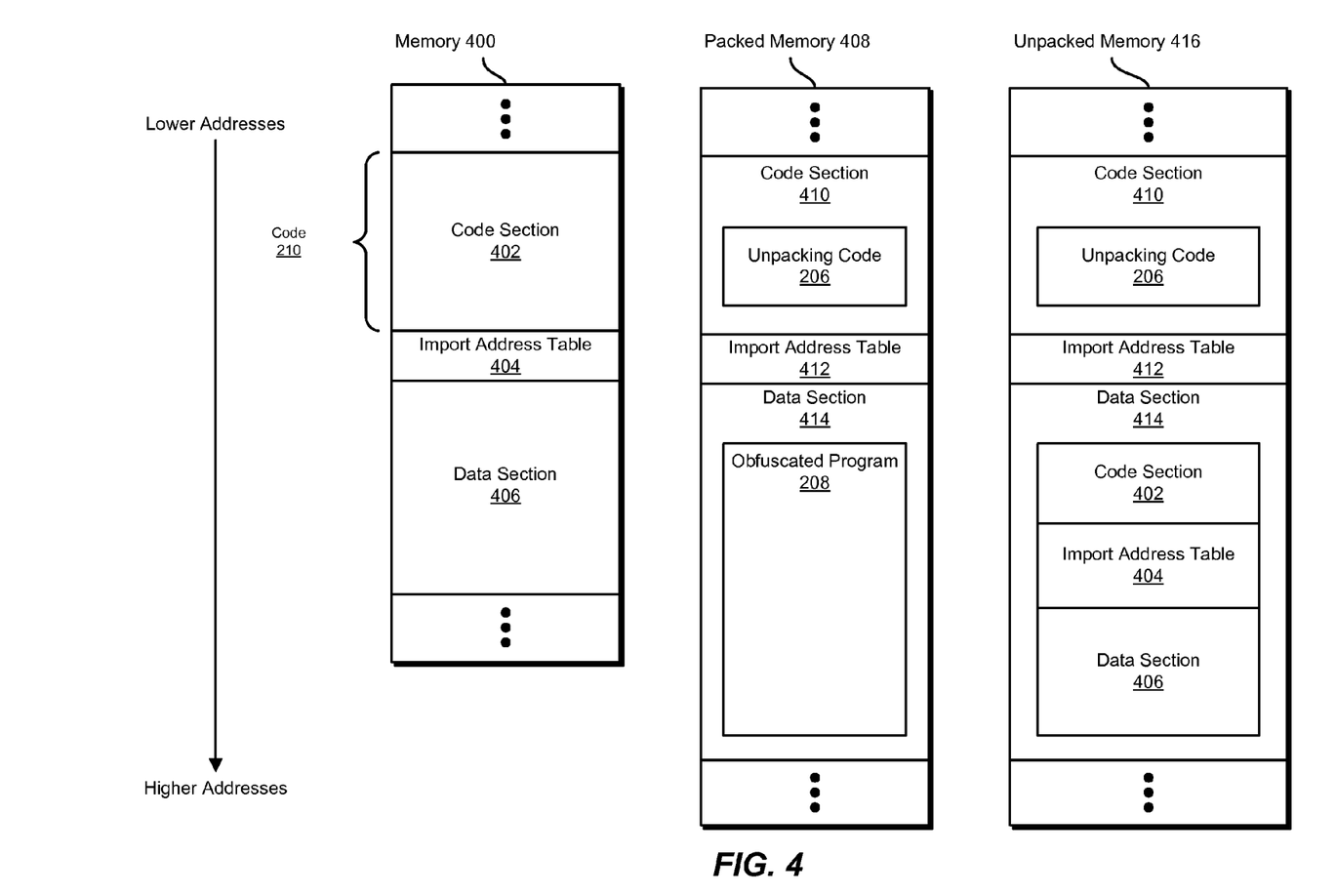
FIG. 4 is a block diagram of exemplary memory of various programs.

In some examples, a program may include a code section, an import address table, and a data section that are loaded into memory when the program is executed. Memory 400 in FIG. 4 illustrates an exemplary runtime memory state of an exemplary program that has not been obfuscated within a packed program. As shown, the runtime memory state of an exemplary program that has not been obfuscated within a packed program may include the program's code section (e.g., code section 402), the program's import address table (e.g., import address table 404), and the program's data section (e.g., data section 406). In the examples used herein, memory 400 may represent the memory of obfuscated program 208.

In some instances, a program may be packed (e.g., compressed, encrypted, and/or otherwise obfuscated) within another program (referred to as a "packed program"). For example, packed program 204 in FIG. 2 may represent a packed program within which obfuscated program 208 has been packed. In some examples, a program may be packed one or more times (e.g., a packed program within which a program has been packed may also be packed within another packed program).

In some examples, the phrase "packed program" may refer to any program created by a packer. The term "packer," as used herein, generally refers to any type or form of tool used to obfuscate programs. Examples of packers that may be used to obfuscate programs include, without limitation, compressors (e.g., ULTIMATE PACKER FOR EXECUTABLES (UPX), ASPACK, and UPACK) that compress files, crypters (e.g., POLYCRYPT PE) that encrypt files, protectors (e.g., ARMADILLO and THEMIDA) that both compress and encrypt files, bundlers (such as PEBUNDLE and MOLEBOX) that bundle multiple executable and data files into a single bundled executable file, and the like.

In some examples, a packed program may include a code section, an import address table, and a data section that are loaded into memory when the packed program is executed. In some examples, the obfuscated program packed within a packed program may be stored within the packed program's data section. Packed memory 408 in FIG. 4 illustrates an exemplary runtime memory state of a packed program when the packed program is first loaded into memory and before any unpacking code of the packed program is executed. In this state, as shown in FIG. 4, the memory of the packed program may include the packed program's code section (e.g., code section 410), the packed program's import address table (e.g., import address table 412), and the packed program's data section (e.g., data section 414) that may include a program in an obfuscated state.

At runtime, the code of a packed program (e.g., unpacking code) may unpack (e.g., decompress and/or decrypt) the program obfuscated within the packed program. The unpacking code of a packed program may unpack an obfuscated program such that the obfuscated program exist within the memory of the packed program in an unobfuscated and executable state. As will be explained in greater detail below, the unpacking code of a packed program may also populate the import address table of the obfuscated program as part of unpacking the obfuscated program. Unpacked memory 416 in FIG. 4 illustrates an exemplary runtime memory state of a packed program after the unpacking code of the packed program has unpacked the program obfuscated within the packed program. In this state, as shown in FIG. 4, the memory of the packed program may include the obfuscated program's code section (e.g., code section 402) in an unobfuscated state, the obfuscated program's import address table (e.g., import address table 404) in an unobfuscated state, and the obfuscated program's data section (e.g., data section 406) in an unobfuscated state. In the examples used herein, packed memory 408 and unpacked memory 416 may represent runtime states of memory 212.

Returning to FIG. 3, the systems described herein may perform step 302 in any suitable manner. In one example, retrieving module 104 may capture the memory of a packed program within which the code of an obfuscated program exists in an unobfuscated state by capturing the memory of the packed program after the packed program has executed for at least long enough for unpacking code of the packed program to unpack (e.g., decompress and/or decrypt) the code of the obfuscated program into the memory of the packed program. Using FIG. 4 as an example, executing module 104 may capture unpacked memory 416 after unpacking code 206 has unpacked obfuscated program 208 from packed memory 408. In at least one example, retrieving module 104 may retrieve the memory of a packed program using an unpacker. For example, retrieving module 104 may retrieve the memory of a packed program using a static analysis-based unpacker capable of unpacking the packed program without executing the packed program.

At step 304, one or more of the systems described herein may identify an import address table within the memory of the packed program. For example, identifying module 106 may, as part of computing system 200 in FIG. 2, identify import address tables 404 and 412 within unpacked memory 416 of packed program 204.

As used herein, the phrase "import address table" generally refers to a lookup table that may be used by a program to access shared-library functions (e.g., dynamic-link library functions). At runtime, a program's import address table may include pointers to the shared-library functions that may be accessed by the program. Each entry of an import address table may include the address of a shared-library function. However, when a program is first loaded into memory the program's import address table may include information that may be used to look up the shared-library functions accessed by the program, and a loader may use this information to populate the import address table with the addresses of the shared-library functions that may be accessed by the program.

When loading a packed program, a loader may populate the import address table of the packed program but may be unable to populate the import address table of a obfuscated program because the import address table of the obfuscated program may be in an obfuscated state when the packed program is first loaded into memory. For at least this reason, the unpacking code of the packed program may populate the import address table of an obfuscated program as part of unpacking the obfuscated program before executing the obfuscated program.

The systems described herein may perform step 304 in any suitable manner. For example, identifying module 106 may identify an import address table within the memory of a packed program by identifying each entry of the import address table within the memory of the packed program. In some examples, identifying module 106 may identify an entry of an import address table within the memory of a packed program by identifying the instructions within the memory of the packed program that use the entry to access a shared-library function.

Various instructions may be used to access a function of a shared library via an import-address-table entry. For example, a shared-library function may be accessed via an import-address-table entry using an indirect call instruction (e.g., a call instruction that uses a pointer to an import-address-table entry such as instruction 508 in FIG. 5). Additionally or alternatively, a shared-library function may be accessed via an import-address-table entry using a jmp-thunk-table based call (e.g., a call instruction that calls a jmp instruction that uses a pointer to an import-address-table entry such as instructions 510 and 512 in FIG. 5). For at least this reason, identifying module 106 may identify an import-address-table entry by identifying each indirect call or jmp-thunk-table based call within the memory of a packed program and by identifying the address of the import-address-table entry with which the instructions access the import-address-table entry.

Figure 5:
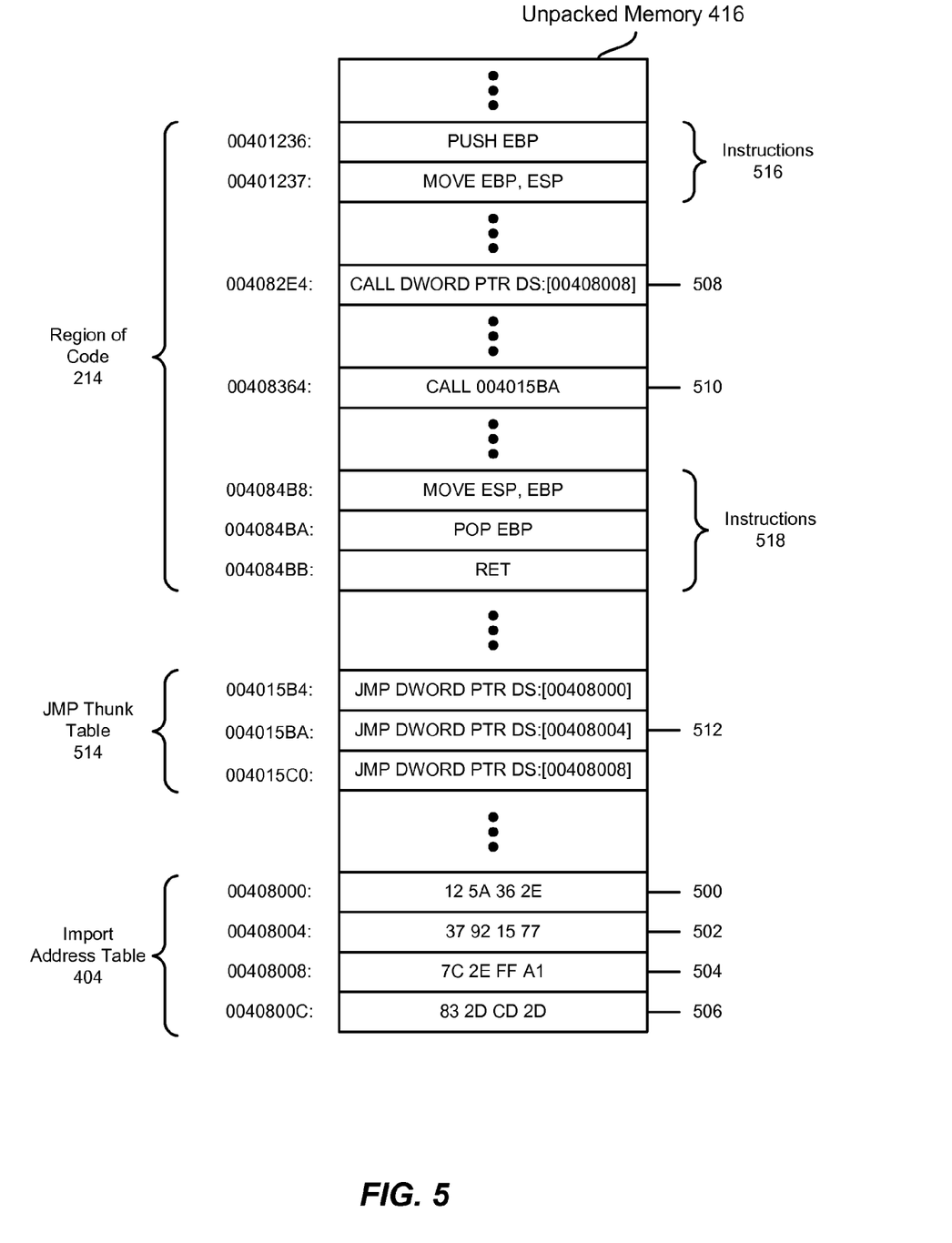
FIG. 5 is a block diagram of exemplary memory of a packed program.

Using FIG. 5 as an example, identifying module 106 may identify import-address-table entries 500-506 by identifying each indirect call or jmp-thunk-table based call within unpacked memory 416 (e.g., instructions 508-512) and by identifying the addresses of import-address-table entries 500-506 with which these instructions access import-address-table entries 500-506 (e.g., address "00408008" used by instruction 508 to access import-address-table entry 504 and address "00408004" used by instructions 510 and 512 to access import-address-table entry 502). Identifying module 106 may identify import-address-table entries 500 and 506 in a similar manner.

In general, the entries of an import address table may be continuous within the memory of a packed program. As such, upon identifying all or a portion of the import-address-table entries within the memory of a packed program, identifying module 106 may identify an import address table by identifying two or more continuous import-address-table entries within the memory of the packed program. Using FIG. 5 as an example, identifying module 106 may identify import address table 404 by determining that import-address-table entries 500-508 are located continuously within unpacked memory 416.

In at least one example, identifying module 106 may identify each entry of an import address table by monitoring the unpacking code of a packed program as the unpacking code populates the entries of the import address table. In some instances, the unpacking code of a packed program may use certain shared-library functions (e.g., "GetProcAddress") to determine an address of a shared-library function to include within an import-address-table entry. For at least this reason, identifying module 106 may identify the address that may be included in an import-address-table entry by hooking calls to such shared-library functions. Upon identifying an address that may be included in an import-address-table entry, identifying module 106 may identify the location of the import-address-table entry within the memory of the packed program by searching the memory of the packed program for the address.

At step 306, one or more of the systems described herein may determine, based at least in part on at least one characteristic of the import address table, that the import address table is an import address table of the code of the obfuscated program. For example, import-address-table determining module 108 may, as part of computing system 200 in FIG. 2, determine that import address table 404 in FIG. 4 may be the import address table of obfuscated program 208 based on import address table 404 being larger than import address table 412.

The systems described herein may perform step 306 in any suitable manner. In one example, import-address-table determining module 108 may determine which import address table from among the import address tables found within the memory of a packed program is the import address table of the code of the obfuscated program by comparing one or more characteristics of the import address tables (such as, e.g., size, location, and/or shared-library function addresses).

In some instances, the unpacking code of a packed program may use a relatively small number of shared-library functions to unpack an obfuscated program as compared to the number of shared-library functions used by the obfuscated program. For at least this reason, whether an import address table is the largest import table found within the memory of a packed program may indicate whether the import address table is or is not an import address table of an obfuscated program packed within the packed program. As such, import-address-table determining module 108 may determine that an import address table is the import address table of an obfuscated program by determining that the import address table is the largest import address table within the memory of a packed program.

In some instances, the location of an import address table within the memory of a packed program in relation to other import address tables within the memory of the packed program may indicate whether the import address table is or is not an import address table of an obfuscated program. For example in some instances, the data section of a program may be located at higher addresses within the memory of the program as compared to the location of the import address table and/or the code section of the program (e.g., as illustrated in FIGS. 4 and 5). Because obfuscated programs are generally stored within the data section of a packed program, import-address-table determining module 108 may determine that an import address table is the import address table of an obfuscated program by determining that the import address table has the highest address compared to other import address tables within the memory of a packed program.

In some instances, whether an import address table includes addresses to shared-library functions other than those used for unpacking operations may indicate whether the import address table is or is not an import address table of an obfuscated program. For example in some instances, the import address table of a packed program may include the addresses of shared-library functions that are used to allocate memory, change memory protection, and/or populate import address tables. As such, import-address-table determining module 108 may determine that an import address table is the import address table of an obfuscated program by determining that the import address table includes addresses to shared-library functions that are not used for unpacking operations.

As mentioned above, the unpacking code within a packed program may populate the import address table of an obfuscated program as part of unpacking the obfuscated program. In at least one example, import-address-table determining module 108 may determine that an import address table may be the import address table of an obfuscated program by determining that the import address table was the last import address table within the memory of a packed program to be populated.

In some examples, import-address-table determining module 108 may determine whether an import address table from among the import address tables found within the memory of a packed program may be the import address table of an obfuscated program by examining one or more characteristics of the import address table. For example in some instances, whether an import address table is larger than a predetermined threshold may indicate whether the import address table is or is not an import address table of an obfuscated program. As such, import-address-table determining module 108 may determine that an import address table is the import address table of an obfuscated program by determining that the import address table is larger than a predetermined threshold.

At step 308, one or more of the systems described herein may determine that a region of code within the memory of the packed program may be all or a portion of the code of the obfuscated program by determining that the region of code uses the import address table. For example, code-region determining module 110 may, as part of computing system 200 in FIG. 2, determine that region of code 214 of packed program 204 may be all or a portion of code 210 by determining that region of code 214 uses import address table 404.

The systems described herein may perform step 308 in any suitable manner. In one example, code-region determining module 110 may identify a region of code within the memory of the packed program that may include all or a portion the code of the obfuscated program by identifying each function within the memory of the packed program within which an instruction uses the import address table and by determining that the region of code includes at least each identified function.

In some examples, code-region determining module 110 may identify a region of code within the memory of the packed program that may include all or a portion the code of the obfuscated program by tracking the start address and the end address of each function within the memory of the packed program within which an instruction uses the import address table and by determining that the region of code includes at least the memory of the packed program between the lowest identified start address and the highest identified end address. Using FIG. 5 as an example, code-region determining module 110 may determine that region of code 214 includes the region of memory of packed program 204 from address 00401236 to address 00408466 by determining that instructions 516 represent the start of a function with the lowest start address of any function that uses import address table 404 (e.g., the start address of the function that includes instruction 508) and by determining that instructions 518 represent the end of a function with the highest end address of any function that uses import address table 404 (e.g., the end address of the function that includes instruction 510).

At step 310, one or more of the systems described herein may perform a security operation on the region of code. For example, security module 112 may, as part of computing system 200 in FIG. 2, perform a security operation on region of code 214.

The systems described herein may perform step 310 in any suitable manner. For example, security module 112 may perform the security operation on the region of code by classifying (e.g., as malicious, potentially malicious, or benign) the region of code, by classifying the obfuscated program to which the region of code belongs, by classifying the packed program within which the region of code has been obfuscated, by preventing the region of code from executing, and/or by notifying a user who is attempting to execute the packed program that the packed program is potentially malicious.

Additionally and/or alternatively, security module 112 may perform the security operation on the region of code by analyzing the region of code. For example, security module 112 may analyze the region of code for features of malware that may be used to classify the region of code as malicious, potentially malicious, or benign. Upon completion of step 310, exemplary method 300 in FIG. 3 may terminate.

As explained above, by identifying an import address table within the memory of a packed program that corresponds to the code of a malicious program obfuscated within the packed program, the systems and methods described herein may distinguish the code of the malicious program from other code within the memory of the packed program (e.g., unpacking code). Moreover, by distinguishing the code of a malicious program from other code within the memory of a packed program, the systems and methods described herein may enable the malicious program to be detected and/or analyzed. For example, the systems and methods described herein may detect and analyze the code of a malicious program obfuscated within a packed program by (1) retrieving memory of the packed program that includes the malicious program in an unobfuscated state, (2) identifying an import address table within the memory of the packed program, (3) determining that the import address table within the memory of the packed program is an import address table of the code of the malicious program, (4) determining that a region of code within the memory of the packed program corresponds to the code of the malicious program by determining that the region of code uses the import address table, and (5) classifying the region of code as malicious.

Figure 6:
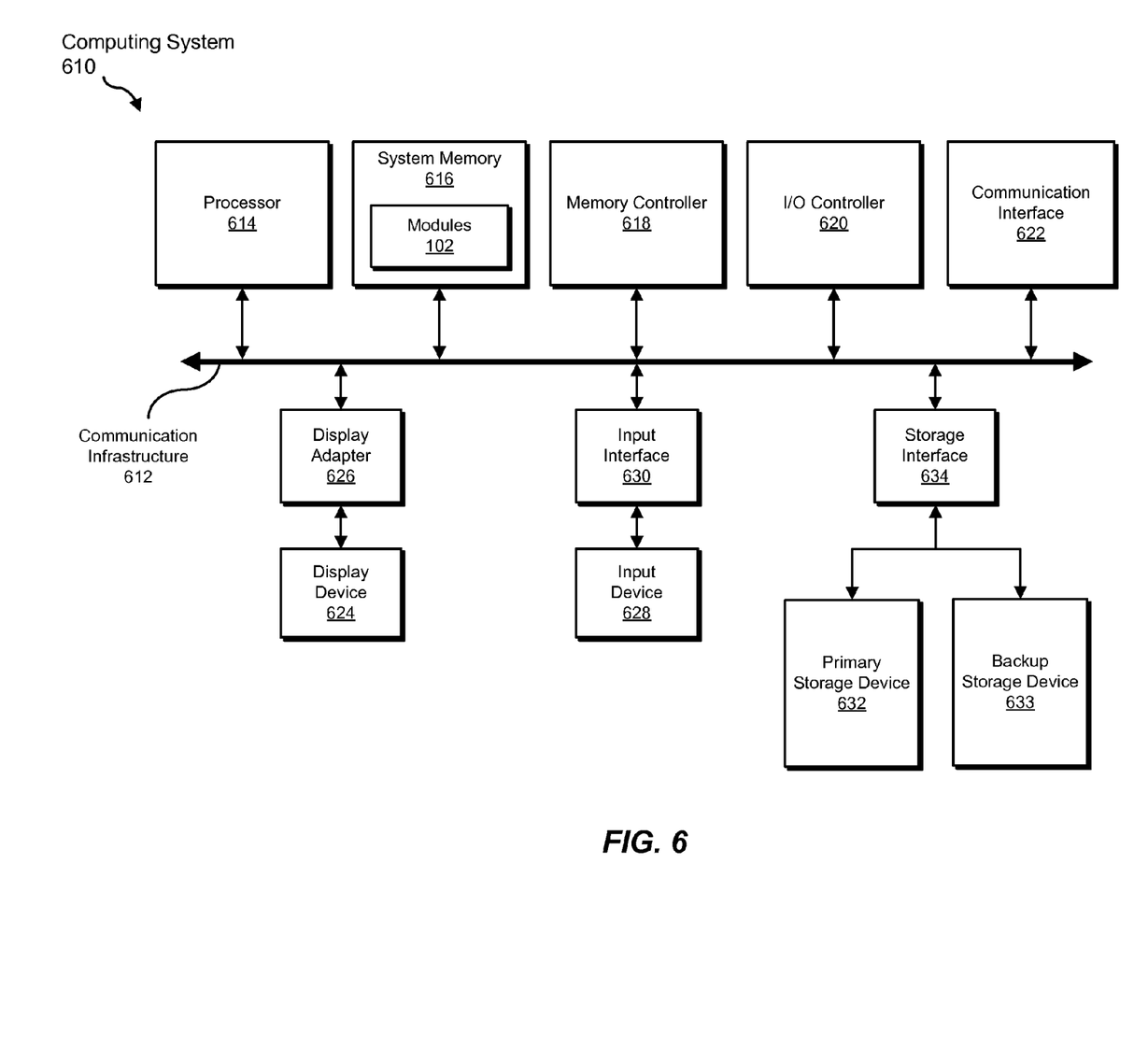
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610.

Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
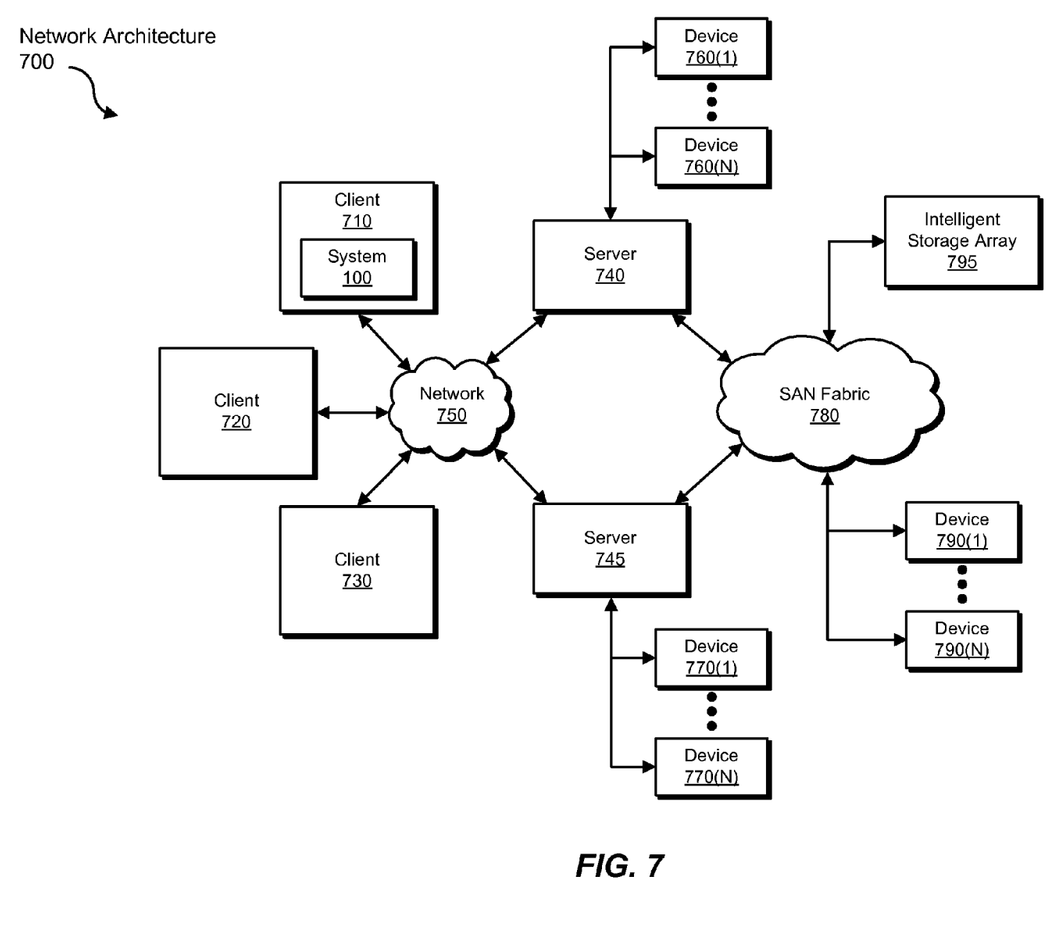
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for distinguishing code of a program obfuscated within a packed program.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive the unpacked memory of a packed program to be transformed, transform the unpacked memory of the packed program into all or a portion of the code of a program that has been obfuscated within the packed program, output a result of the transformation to a system for analyzing and/or classifying malware, use the result of the transformation to analyze the code of the obfuscated program and/or classify the packed program and/or the obfuscated program as malware, and store the result of the transformation to a storage system for storing malicious and/or benign code samples. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for distinguishing code of a program obfuscated within a packed program, at least a portion of the method being performed by a computing device comprising at least one processor, the method comprising:
    retrieving memory of the packed program, wherein the memory of the packed program comprises at least:
        the code of the obfuscated program in an unobfuscated state;
        unpacking code that unpacks the code of the obfuscated program when the packed program is executed;
    identifying a first import address table and a second import address table within the memory of the packed program;
    determining, based at least in part on a comparison between at least one characteristic of the first import address table and at least one characteristic of the second import address table, that the first import address table is an import address table of the code of the obfuscated program;
    determining that a region of code within the memory of the packed program comprises the code of the obfuscated program by determining that the region of code uses the first import address table;
    performing a security operation on the region of code.

2. The computer-implemented method of claim 1, wherein identifying the first import address table comprises:
    identifying import-address-table entries within the memory of the packed program;
    identifying two or more continuous import-address-table entries from the import-address-table entries, wherein the two or more continuous import-address-table entries comprise the first import address table.

3. The computer-implemented method of claim 2, wherein identifying the import-address-table entries comprises identifying, for each of the import-address-table entries, a memory address with which at least one instruction within the memory of the packed program accesses the import-address-table entry.

4. The computer-implemented method of claim 1, wherein determining that the first import address table is the import address table of the code of the obfuscated program comprises determining that the first import address table is larger than the second import address table.

5. The computer-implemented method of claim 1, wherein determining that the first import address table is the import address table of the code of the obfuscated program comprises determining that the first import address table is larger than a predetermined threshold.

6. The computer-implemented method of claim 1, wherein the determination that the first import address table is the import address table of the code of the obfuscated program is based at least in part on where the first import address table is located within the memory of the packed program in relation to the second import address table within the memory of the packed program.

7. The computer-implemented method of claim 1, wherein determining that the first import address table is the import address table of the code of the obfuscated program comprises determining that the first import address table comprises addresses to shared-library functions that are not used for unpacking operations.

8. The computer-implemented method of claim 1, wherein determining that the first import address table is the import address table of the code of the obfuscated program comprises determining that the first import address table was populated later than the second import address table.

9. The computer-implemented method of claim 1, wherein determining that the region of code comprises the code of the obfuscated program comprises determining that at least one instruction within the region of code uses the first import address table.

10. The computer-implemented method of claim 1, wherein determining that the region of code comprises the code of the obfuscated program comprises:

identifying functions within the memory of the packed program that include at least one instruction that uses the first import address table;

identifying, from among the functions within the memory of the packed program that include at least one instruction that uses the first import address table:

a first function whose start address within the memory of the packed program is lowest;

a second function whose end address within the memory of the packed program is highest, wherein the region of code comprises a region of the memory of the packed program from the start address of the first function to the end address of the second function.

11. The computer-implemented method of claim 1, wherein performing the security operation on the region of code comprises determining that the region of code comprises malware.

12. The computer-implemented method of claim 11, further comprising, in response to determining that the region of code comprises malware, performing at least one of:

preventing the region of code from executing;

notifying a user who is attempting to execute the packed program that the packed program is potentially malicious.

13. A system for distinguishing code of a program obfuscated within a packed program, the system comprising:

a retrieving module, stored in memory, that retrieves memory of the packed program, wherein the memory of the packed program comprises:

the code of the obfuscated program in an unobfuscated state;

unpacking code that unpacks the code of the obfuscated program when the packed program is executed;

an identifying module, stored in memory, that identifies a first import address table and a second import address table within the memory of the packed program;

an import-address-table determining module, stored in memory, that determines, based at least in part on a comparison between at least one characteristic of the first import address table and at least one characteristic of the second import address table, that the first import address table is an import address table of the code of the obfuscated program;

a code-region determining module, stored in memory, that determines that a region of code within the memory of the packed program comprises the code of the obfuscated program by determining that the region of code uses the first import address table;

a security module, stored in memory, that performs a security operation on the region of code;

at least one physical processor that executes the retrieving module, the identifying module, the import-address-table determining module, the code-region determining module, and the security module.

14. The system of claim 13, wherein the identifying module identifies the first import address table by:

identifying import-address-table entries within the memory of the packed program;

identifying two or more continuous import-address-table entries from the import-address-table entries, wherein the two or more continuous import-address-table entries comprise the first import address table.

15. The system of claim 14, wherein the identifying module identifies the import-address-table entries by identifying, for each of the import-address-table entries, a memory address with which at least one instruction within the memory of the packed program accesses the import-address-table entry.

16. The system of claim 13, wherein the import-address-table determining module determines that the first import address table is the import address table of the code of the obfuscated program by determining that the first import address table is larger than the second import address table.

17. The system of claim 13, wherein the import-address-table determining module determines that the first import address table is the import address table of the code of the obfuscated program based at least in part on where the first import address table is located within the memory of the packed program in relation to the second import address table within the memory of the packed program.

18. The system of claim 13, wherein the import-address-table determining module further determines that the first import address table is the import address table of the code of the obfuscated program by determining that the first import address table comprises addresses to shared-library functions that are not used for unpacking operations.

19. The system of claim 13, wherein the code-region determining module determines that the region of code comprises the code of the obfuscated program by:

identifying functions within the memory of the packed program that include at least one instruction that uses the first import address table;

identifying, from among the functions within the memory of the packed program that include at least one instruction that uses the first import address table:

a first function whose start address within the memory of the packed program is lowest;

a second function whose end address within the memory of the packed program is highest, wherein the region of code comprises a region of the memory of the packed program from the start address of the first function to the end address of the second function.

20. A non-transitory computer-readable medium comprising one or more computer-executable instructions that, when executed by at least one processor of a computing device, cause the computing device to distinguish code of a program obfuscated within a packed program by:

retrieving memory of the packed program, wherein the memory of the packed program comprises at least:

the code of the obfuscated program in an unobfuscated state;

unpacking code that unpacks the code of the obfuscated program when the packed program is executed;

identifying a first import address table and a second import address table within the memory of the packed program;

determining, based at least in part on a comparison between at least one characteristic of the first import address table and at least one characteristic of the second import address table, that the first import address table is an import address table of the code of the obfuscated program;

determining that a region of code within the memory of the packed program comprises the code of the obfuscated program by determining that the region of code uses the first import address table;

performing a security operation on the region of code.

* * * * *